Jan. 24, 1961
J. H. ANDRESEN, JR
2,969,502
DIFFERENTIAL TACHOMETER
Filed Oct. 16, 1957
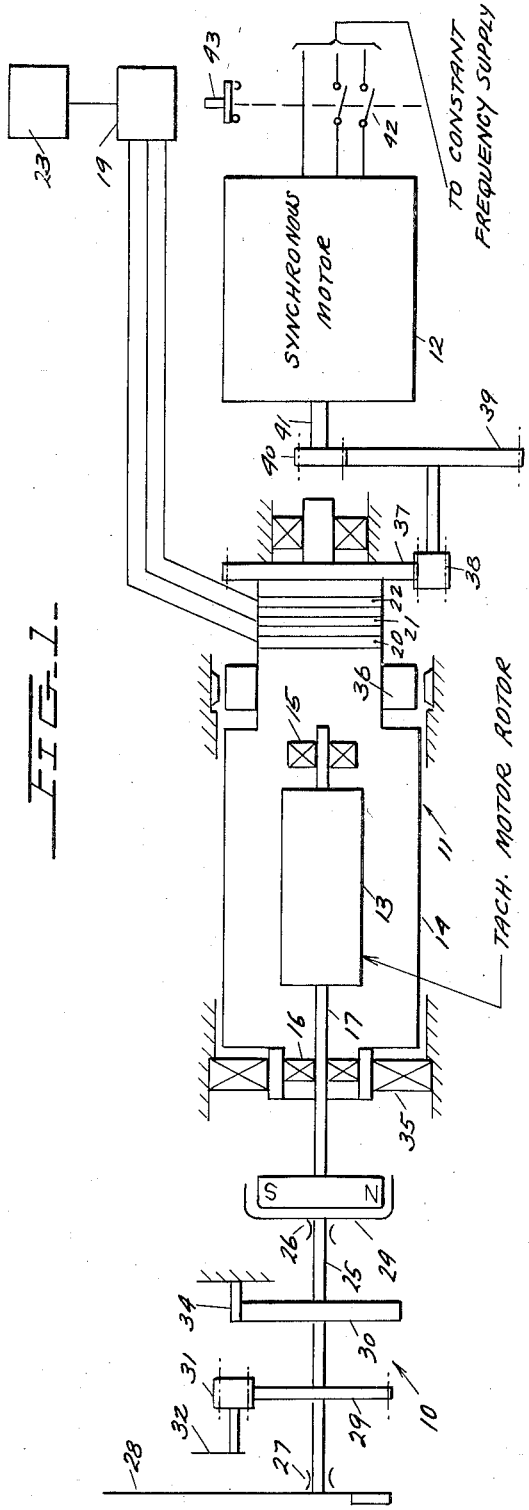
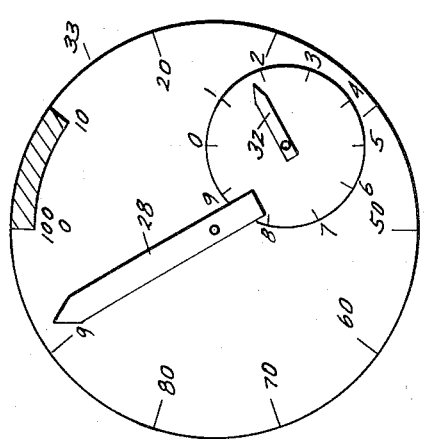
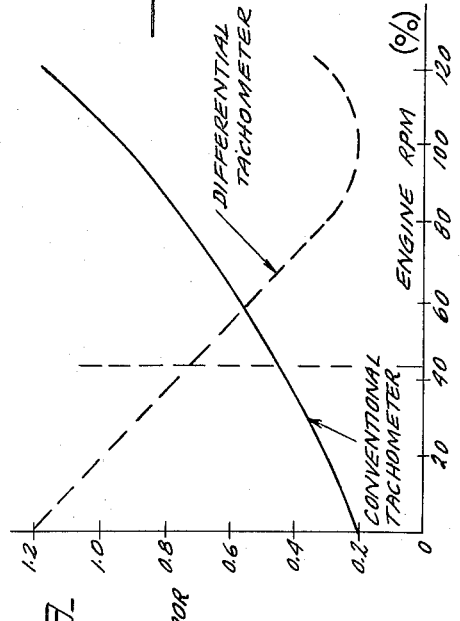
INVENTOR.
JOHN H. ANRESEN, JR.
BY
ATTORNEYS

2,969,502

DIFFERENTIAL TACHOMETER

John H. Andresen, Jr., Greenwood Lake, N.Y., assignor to Kollsman Instrument Corporation, Elmhurst, N.Y., a corporation of New York Filed Oct. 16, 1957, Ser. No. 690,560

6 Claims. (Cl. 324—70)

My invention relates to a differential tachometer wherein a tachometer indicating device is selectively driven from a rotating member or from the output of a differential motion having the rotating member and a standard frequency rotating member as inputs.

While my novel differential is applicable to any type of tachometer device, it is particularly useful in conjunction with tachometers for jet engines.

Present types of jet engine tachometers where the coupling between the tachometer indicating means and the rotating member is of the magnet-drag cup type having inherent errors amounting to 1–1.5% in the cruising range. In order of importance, these errors are due to:

(1) Changes in ambient temperature causing changes in magnetic flux and conductivity of drag cup.
(2) Differential heating due to temperature rise of motor causing uncompensated transient errors as in (1).
(3) Position error (attitude) due to end play in cup or magnet shaft, which in turn changes magnet coupling.
(4) Vibration causing displacement of pointer.
(5) Calibration spring position error, hysteresis, and non-linearity.
(6) Friction.
(7) Static unbalance of cup and pointer.
(8) Reading error.
(9) Dial errors.

Some of these causes of error, particularly the first three, function to increase the magnitude of error with increasing r.p.m. This places the region of maximum error in r.p.m. in the highest speed ranges, which is the cruising range of jet engines (90% to 105%).

It is a characteristic of jet engines that a great change in thrust occurs for a proportionately small change in r.p.m. in the operating range. Hence, although present tachometers appear to be sufficiently accurate (1%) as compared to most other aircraft instruments, a greater accuracy is necessary in the region of 90% to 110% speed. For starting a jet engine, it is important to know the engine r.p.m. to fairly high accuracy in the 5% to 15% speed range. Present tachometers generally have sufficient accuracy in this range.

The essence of my novel invention is to drive the tachometer indicating means through a differential means having the rotating member and a constant frequency rotating member such as a synchronous motor as inputs when the rotating member is operating at its higher speed ranges. Thus, the tachometer indicating means with a properly calibrated indicating dial will be operating at the more accurate low speed ranges when the member operates at high speed values.

Accordingly, the primary object of my invention is to provide a novel tachometer device having an improved accuracy in its high speed range.

Another object of my invention is to provide a novel tachometer which may be driven through a differential means having a constant frequency rotating member as an input.

Another object of my invention is to provide a differential tachometer device utilizing a synchronous motor where the tachometer absolute accuracy at high speeds is comparable to its low speed accuracy rather than yielding an error which is a constant percentage of the actual speed.

A still further object of my invention is to provide a differential tachometer that will operate as a conventional tachometer after a failure of an auxiliary constant speed rotation means.

These and other objects of my invention will become apparent from the following description when taken in conjunction with the drawings in which:

Figure 1 illustrates a preferred embodiment of my novel invention.

Figure 2 shows a front view of the indicating dial of Figure 1.

Figure 3 shows a plot of tachometer error as a function of percent of full speed for the differential tachometer of Figure 1.

Referring now to Figure 1, it is seen that my novel differential tachometer is comprised of a standard magnetic tachometer indicator seen generally at numeral 10, a tachometer synchronous motor 11, and a second synchronous motor 12.

The tachometer motor 11 is shown in cross-section as comprising a rotor 13 and a stator 14. The rotor 13 is rotatably supported within the stator 14 by bearings 15 and 16 with the output shaft 17 being attached to permanent magnet 18 having north and south poles N and S respectively. Tachometer motor 11 which may be of the three phase type if desired is energized from a tachometer generator 19 through the collector rings 20, 21 and 22, the tachometer generator 19 being driven by a rotating member 23 schematically shown as box 23 which could be a jet engine rotor.

Accordingly, rotation of rotating member 23 produces output voltages in generator 19 which are functionally related to the speed of rotating member 23, and the tachometer motor 11 and output shaft 17 and its magnet 18 is rotated at a speed which is functionally related to the speed of rotating member 23.

As is well known in the art, tachometer indicator 10 includes a conductive cup 24 which has the magnet 18 positioned therein whereby rotation of magnet 18 induces eddy currents within cup 24. These eddy currents then produce magnetic fields which interact with the magnetic field of magnet 18 so that cup 24 has a torque imparted thereto which is functionally related to the angular velocity of magnet 18.

The center of cup 24 then has a shaft 25 connected thereto and supported by bearings 26 and 27. Shaft 25 is terminated by a coarse pointer 28 and has gear 29 and spiral spring 30 connected thereto.

Gear 29 is then coupled to gear 31 which serves to drive a fine pointer 32 in any desired ration with respect to the coarse pointer 28. Thus, as shown in Figure 2 which further shows indicating dial 33, the fine pointer 32 may make 10 revolutions for each revolution of coarse pointer 28.

The spiral spring 30 which has one end terminated on shaft 25 and its other end terminated at fixed support 34 operates to oppose the torque imparted to cup 24 by rotating magnet 18. Since this type of arrangement is well known in the art, details thereof will not be described herein. However, it is apparent that pointers 28 and 32 will be positioned in accordance with the torque imparted to cup 24. Since this torque is in turn dependent upon the angular velocity of cup 18, it is clear that the position of pointers 28 and 37 may be calibrated to show the angular velocity of rotating member 23.

The system above described is the type system well known in the art. A typical characteristic of this system is shown in the solid line of Figure 3 which shows that the percentage error of full range (or the absolute error in r.p.m.) of the system increases appreciably as the rotating member 23 approaches its rated speed while the accuracy at lower speeds is relatively high.

In accordance with my novel invention, I provide the synchronous motor 12 of Figure 1 to drive the stator 14 of tachometer motor 11 differentially with respect to rotor 13 to thereby achieve substantially improved accuracy in the higher speed ranges of rotating member 23.

Thus, the tachometer motor stator 14 is rotatably supported from a relatively stationary support by bearing 35 and, if desired, by an overriding clutch 36 which may be of the ratchet type to allow rotation in only one direction.

The stator 14 then has a gear 37 attached thereto which cooperates with the gear train including gears 38, 39, and gear 40 which is connected to the output shaft 41 of synchronous motor 12. Synchronous motor 12 is then energized from a constant frequency supply as indicated through the synchronous motor cutout switch 42.

The operation of my novel differential tachometer may now be given, as applied to jet engines for illustrative purposes wherein rotatable member 23 is the rotor of the jet engine.

The jet engine starter switch 43 is shown in Figure 1 as being fanged to the cut out switch 42 whereby synchronous motor 12 is disconnected from its constant frequency source when the starting switch 43 is depressed. Thus, the tachometer functions as a normal tachometer during the initial low speed period of jet engine rotor 23 when the jet engine is being brought up to starting speed with the desired high accuracy as shown in Figure 3.

When the starting switch 43 is released the switch 42 is closed and synchronous motor 12 is energized. Synchronous motor 12 and its associated gear train are preferably designed to rotate tachometer stator 14 at the speed that would be imparted to rotor 13 when member 23 is operated at 100% speed, but is an opposite direction. Thus, the absolute speed of rotor 13 will change by an amount corresponding to a change in the large pointer 28 indication of exactly one turn (or 360°) in the negative direction. That is to say, since dial 33 of Figure 2 is designed to have the range of 0 to 100% speed correspond to 360° on the large pointer, this stator rotation corresponds to the normal rotor speed relative to the stator for 100% engine speed, but in the opposite direction of rotation.

Therefore, when the engine speed reaches 100% the shaft 17 of tachometer motor is stationary with respect to the body of the indicator. Thus, the drag cup 24 exerts no torque on the calibrating spring 30 and the pointer will be on exactly 100% (or 0%) speed. Any error will be equivalent to that of a conventional tachometer at zero speed, which is where it is most accurate.

Thus, as seen in the solid line in Figure 3, my novel tachometer achieves relatively high accuracy at high speed rotation of the jet engine rotor.

It is fundamental to the principle of operation that zero speed for the magnet corresponds to the most accurate r.p.m. indication. In order to have standby operation (at conventional tachometer accuracy), it is necessary that zero r.p.m. also correspond to zero rotation of the magnet.

This implies that there be ambiguous indications above the selected most accurate speed and that the synchronous motor operation correspond to a full turn on the coarse pointer. The dial of Figure 2 100% corresponds to the most accurate speed. This requires that the dial be ambiguous above 100% speed. That is, 105% has the same indication as 5%.

It is important to note that complete failure of the constant frequency supply will cause the instrument to revert to normal tachometer indication without pilot's attention.

In the foregoing, I have described my invention only in connection with preferred embodiments thereof. Many variations and modifications of the principles of my invention within the scope of the description herein are obvious. Accordingly, I prefer to be bound not by the specific disclosure herein but only by the appending claims.

I claim:

1. A tachometer system for measuring and indicating the speed of rotation of a rotating member; said tachometer system including an indicator means operable to indicate a speed range from zero to 100 percent of the rated speed of said rotating member, a standard frequency rotating means, and a differential connecting means; said differential connecting means having a first and second input means operatively connected to said rotating member and said standard frequency rotating means respectively and an output means operatively connected to said indicator means; said standard frequency rotating means driving said output means to cause said indicator means to indicate 100 percent of rated speed when said rotating member does not rotate and control means for rendering said standard frequency rotating means ineffective when said rotating member rotates in a low range of rated speed.

2. A tachometer system for measuring and indicating the speed of rotation of a rotating member; said tachometer system including an indicator means operable to indicate a speed range from zero to 100 percent of the rated speed of said rotating member, a standard frequency rotating means, and a differential connecting means; said differential connecting means having a first and second input means operatively connected to said rotating member and said standard frequency rotating means respectively and an output means operatively connected to said indicator means; said standard frequency rotating means driving said output means to cause said indicator means to indicate 100 percent of rated speed when said rotating member does not rotate and control means for rendering said standard frequency rotating means ineffective when said rotating member rotates in a low range of rated speed; said differential connecting output means including a drag cup for connecting to said indicator means.

3. A tachometer system for measuring and indicating the speed of rotation of a rotating member; said tachometer system including an indicator means operable to indicate a speed range from zero to 100 percent of the rated speed of said rotating member, a standard frequency rotating means, and a differential connecting means; said differential connecting means having a first and second input means operatively connected to said rotating member and said standard frequency rotating means respectively and an output means operatively connected to said indicator means; said standard frequency rotating means driving said output means to cause said indicator means to indicate 100 percent of rated speed when said rotating member does not rotate and control means for rendering said standard frequency rotating means ineffective when said rotating member rotates in a low range of rated speed; said differential connecting means including a tachometer motor; one of the stator or rotor of said tachometer motor being rotatably driven in a first direction in accordance with the speed of rotation of said rotating member; the other of said stator or rotor being rotatably driven in a direction opposite said first direction in accordance with the speed of rotation of said standard frequency rotating means.

4. A tachometer system for measuring and indicating the speed of rotation of a rotating member; said tachometer system including an indicator means operable to indicate a speed range from zero to 100 percent of the rated speed of said rotating member, a standard frequency rotating means, and a differential connecting means; said differential connecting means having a first and second input means operatively connected to said rotating member and said standard frequency rotating means respectively and an output means operatively connected to said indicator means; said standard frequency rotating means driving said output means to cause said indicator means to indicate 100 percent of rated speed when said rotating member does not rotate and control means for rendering said standard frequency rotating means ineffective when said rotating member rotates in a low range of rated speed; said indicator means including a rotatable pointer; said rotatable pointer executing one full turn when driven from said zero percent rated speed to 100 percent rated speed; said standard frequency rotating means causing said pointer to execute one full turn.

5. A tachometer system for measuring and indicating the speed of rotation of a rotating member; said tachometer system including an indicator means operable to indicate a speed range from zero to 100 percent of the rated speed of said rotating member, a standard frequency rotating means, and a differential connecting means; said differential connecting means having a first and second input means operatively connected to said rotating member and said standard frequency rotating means respectively and an output means operatively connected to said indicator means; said standard frequency rotating means driving said output means to cause said indicator means to indicate 100 percent of rated speed when said rotating member does not rotate and control means for rendering said standard frequency rotating means ineffective when said rotating member rotates in a low range of rated speed; said differential connecting means including a tachometer motor; one of the stator or rotor of said tachometer motor being rotatably driven in a first direction in accordance with the speed of rotation of said rotating member; the other of said stator or rotor being rotatably driven in a direction opposite said first direction in accordance with the speed of rotation of said standard frequency rotating means; said indicator means including a rotatable pointer; said rotatable pointer executing one full turn when driven from said zero percent rated speed to 100 percent rated speed; said standard frequency rotating means causing said pointer to execute one full turn.

6. A tachometer system for measuring and indicating the speed of rotation of a rotating member; said tachometer system including an indicator means operable to indicate a speed range from zero to 100 percent of the rated speed of said rotating member, a standard frequency rotating means, and a differential connecting means; said differential connecting means having a first and second input means operatively connected to said rotating member and said standard frequency rotating means respectively and an output means operatively connected to said indicator means; said standard frequency rotating means driving said output means to cause said indicator means to indicate 100 percent of rated speed when said rotating member does not rotate and control means for rendering said standard frequency rotating means ineffective when said rotating member rotates in a low range of rated speed; said differential connecting means including a tachometer motor; one of the stator or rotor of said tachometer motor being rotatably driven in a first direction in accordance with the speed of rotation of said rotating member; the other of said stator or rotor being rotatably driven in a direction opposite said first direction in accordance with the speed of rotation of said standard frequency rotating means; said indicator means including a rotatable pointer; said rotatable pointer executing one full turn when driven from said zero percent rated speed to 100 percent rated speed; said standard frequency rotating means causing said pointer to execute one full turn; said differential connecting output means including a drag cup for connecting to said indicator means; whereby the accuracy of said indication of said indicating means is the low rated speed accuracy of said differential connecting means at 100 percent rated speed indications.

References Cited in the file of this patent
UNITED STATES PATENTS

| | | |
|---|---|---|
| 2,331,934 | Satterlee | Oct. 19, 1943 |
| 2,422,067 | Bechberger | June 10, 1947 |
| 2,481,196 | Bulliet | Sept. 6, 1949 |
| 2,674,125 | Eagan | Apr. 6, 1954 |
| 2,746,683 | McLaren | May 22, 1956 |